United States Patent
Cho et al.

(10) Patent No.: US 8,316,404 B2
(45) Date of Patent: Nov. 20, 2012

(54) MULTIMEDIA PLAYBACK CONTROL APPARATUS AND METHOD

(75) Inventors: Hyun Wook Cho, Daegu (KR); Dae Gyue Park, Daegu (KR)

(73) Assignee: Samsung Electronics Co., Ltd., Suwon-si (KR)

(*) Notice: Subject to any disclaimer, the term of this patent is extended or adjusted under 35 U.S.C. 154(b) by 1433 days.

(21) Appl. No.: 11/702,645

(22) Filed: Feb. 6, 2007

(65) Prior Publication Data

US 2008/0037951 A1    Feb. 14, 2008

(30) Foreign Application Priority Data

Aug. 11, 2006  (KR) .................. 10-2006-0075952

(51) Int. Cl.
*H04N 7/173* (2011.01)
(52) U.S. Cl. ............... 725/89; 725/90; 709/219
(58) Field of Classification Search ............ 725/86–104; 709/217–231
See application file for complete search history.

(56) References Cited

U.S. PATENT DOCUMENTS

| 5,974,218 A * | 10/1999 | Nagasaka et al. ............ 386/200 |
| 6,496,980 B1 * | 12/2002 | Tillman et al. ................. 725/90 |
| 2009/0282444 A1 * | 11/2009 | Laksono et al. ............... 725/89 |

FOREIGN PATENT DOCUMENTS

| CN | 1336768 A | 2/2002 |
| CN | 1437826 A | 8/2003 |
| KR | 10-2001-0018017 A | 3/2001 |
| KR | 10-2006-0065064 A | 6/2006 |

* cited by examiner

*Primary Examiner* — Annan Shang
(74) *Attorney, Agent, or Firm* — Roylance, Abrams, Berdo & Goodman, LLP (57) ABSTRACT

A multimedia playback control apparatus and method for a mobile terminal are provided and include an apparatus and method for determining whether a fast forward (FF) command or a rewind (REW) command is input while replaying multimedia content, displaying, if a fast forward command or a rewind command is input, reference frames of the multimedia content, determining whether a release command is input while displaying the reference frames, and restarting the playback of the multimedia content from a playback position corresponding to an instant at which the release command is input.

15 Claims, 6 Drawing Sheets

MULTIMEDIA PLAYBACK CONTROL APPARATUS AND METHOD

CROSS-REFERENCE TO RELATED APPLICATIONS

This application claims the benefit under 35 U.S.C. §119(a) of Korean Patent Application No. 10-2006-0075952, filed Aug. 11, 2006 in the Korean Intellectual Property Office, the entire disclosure of which is hereby incorporated by reference.

BACKGROUND OF THE INVENTION

1. Field of the Invention

The present invention relates to a mobile terminal. In particular, the present invention relates to a multimedia playback control apparatus and method for a mobile terminal.

2. Description of the Related Art

Recent advances in wireless communications have expanded possible applications from simple voice services in early cellular networks to new integrated data applications. Further, early text-based data communication applications have evolved into multimedia-based data communication applications.

A mobile terminal implemented with a multimedia playback function accesses a contents server for downloading multimedia contents provided by the contents server. Typically, the contents server allows the mobile terminal to access and download multimedia contents at anytime and at any location.

Video-on Demand (VOD) is a well-known system allowing users to select and watch video content over a network. A VOD system can provide users with motion picture, live broadcasting, and real-time messaging services. These VOD services can be classified as a "stream service" allowing viewing while the video is being downloaded, and as a "downloaded service" in which the content is downloaded in its entirety by the mobile terminal before viewing starts.

The downloaded VOD service has an advantage in that the downloaded contents can be repeatedly replayed.

The stream VOD service receives multimedia content in a unit of packet data (for example, 0.5 Mb), and processes the multimedia content when enough downloaded packets are received to be played as a part of the multimedia content.

Typically, a multimedia playback-enabled mobile terminal is provided with fast forward (FF) and rewind (REW) functions for playback positioning.

When using the FF or REW function, the mobile terminal displays a function position and a function end position in time.

That is, if a signal is input (for example, by continuously pressing a function key) for starting the FF/REW function while replaying a multimedia file, the mobile terminal activates a timer and displays an operation status with a progress bar. If a signal is input (for example, by releasing the function key) for ending the FF/REW function while the FF/REW function operates, the mobile terminal refers to a value of the timer and displays a current playback position of the multimedia content in time.

However, the conventional multimedia playback-enabled mobile terminal does not display progressing frames of the multimedia contents during the operation of the FF/REW function, whereby it is impossible for a user to check progressing frames corresponding to elapsed time, resulting in an inconvenience associated with playback positioning and wasted time searching for a correct playback position.

Accordingly, a need exists for a system and method for providing effective and efficient playback and playback positioning.

SUMMARY OF THE INVENTION

Exemplary embodiments of the present invention have been made in an effort to address the above and other problems, and it is an exemplary object of certain embodiments of the present invention to provide a multimedia playback control apparatus and method thereof for a mobile terminal that are capable of quickly searching for a playback position.

It is another exemplary object of certain embodiments of the present invention to provide a multimedia playback control apparatus and method thereof for a mobile terminal that are capable of improving an effective FF/REW function for playback positioning.

It is still another exemplary object of certain embodiments of the present invention to provide a multimedia playback control apparatus and method thereof for a mobile terminal that are capable of reducing time taken for searching for a playback position by displaying frames progressing during an operation of a FF/REW function.

In accordance with an aspect of exemplary embodiments of the present invention, the above and other objects can be accomplished by providing a multimedia playback control method for a mobile terminal comprising determining whether a fast forward command or a rewind command is input while replaying multimedia content, displaying, if a fast forward command or a rewind command is input, reference frames of the multimedia content, determining whether a release command is input while displaying the reference frames, and restarting playback of the multimedia content from a playback position corresponding to an instant at which the release command is input.

In accordance with another aspect of exemplary embodiments of the present invention, the above and other objects can be accomplished by providing a multimedia playback control method for a mobile terminal comprising accessing a contents server providing a streaming service, receiving multimedia content from the contents server, replaying the multimedia content while receiving the multimedia content from the contents server, determining whether an event occurs while replaying the multimedia, generating, if an event occurs, a playback control information message on the basis of the event, transmitting the playback control information message to the contents server, receiving reference frames of the multimedia content in response to the playback control information, and presenting the reference frames in a sequential order.

In accordance with another aspect of exemplary embodiments of the present invention, the above and other objects can be accomplished by providing a multimedia playback control method for a mobile terminal comprising determining whether a fast forward command or a rewind command is input during a playback of multimedia content, extracting, if a fast forward command or a rewind command is input, information on a winding speed from the command, selecting reference frames from the multimedia content according to the winding speed, and presenting the reference frames in a sequential order.

In accordance with another aspect of exemplary embodiments of the present invention, the above and other objects can be accomplished by providing a streaming multimedia playback control method for a mobile terminal comprising determining whether a first event occurs during a playback of streaming multimedia content, transmitting, if a first event occurs, a first playback control information message to a contents server, receiving reference frames from the contents server in response to the first playback control information message, and presenting images corresponding to the reference frames in a sequential order. The method further comprises determining whether a second event occurs during the presentation of the images corresponding to the reference frames, transmitting, if a second event occurs, a second playback control information message to the contents server, receiving data of the multimedia content from the contents server in response to the second playback control information message, and presenting the data of the multimedia content, in real time, received from the contents server.

In accordance with another aspect of exemplary embodiments of the present invention, the above and other objects can be accomplished by providing a multimedia playback control apparatus of a mobile terminal comprising a keypad unit for inputting playback control commands, a radio frequency unit for transmitting playback control information messages to a contents server and receiving multimedia contents from the contents server, a display unit for displaying multimedia contents and reference frames received in response to the playback control information message, and a control unit for controlling the playback of the multimedia content and the presentation of the reference frames of the multimedia content according to the playback control commands.

In accordance with another aspect of exemplary embodiments of the present invention, the above and other objects can be accomplished by providing a multimedia service system comprising a contents server that transmits reference frames upon receiving a playback control information message while transmitting multimedia content, and at least one mobile terminal that generates a playback control information message if an event occurs while replaying the multimedia content received in real time from the contents server, transmits the playback control information message to the contents server, receives the reference frames in response to the playback control information message, and presents the reference frames in a sequential order.

BRIEF DESCRIPTION OF THE DRAWINGS

The above and other objects, features and advantages of exemplary embodiments of the present invention will become more apparent from the following detailed description in conjunction with the accompanying drawings, in which.

Throughout the drawings, like reference numerals will be understood to refer to like parts, components and structures.

DETAILED DESCRIPTION OF EXEMPLARY EMBODIMENTS

Exemplary embodiments of the present invention are described in detail below with reference to the accompanying drawings. The same reference numbers will be used throughout the drawings to refer to the same or like parts. Detailed descriptions of well-known functions and structures incorporated herein are omitted for clarity and conciseness.

In exemplary embodiments of the present invention, a mobile terminal accesses a contents server and replays multimedia contents received from the contents server in real time (such as a stream service). However, embodiments of the present invention are not limited to the stream service, but can be implemented with any number of various contents services served by a server connected through a network.

In order to clarify a range of exemplary embodiments of the present invention and help provide an understanding of exemplary embodiments of the present invention, any data that can be stored and played back by a predetermined application program in a mobile terminal is called multimedia contents in the following description.

The following description of exemplary embodiments of the present invention is applied to a mobile terminal, however any number of other devices such as personal digital assistants (PDAs), smart phones, MP3 Players, laptop computers, personal computers, digital cameras, cellular phones, personal communication service (PCS) phones, dedicated DMB receivers, International Mobile Telecommunication 2000 (IMT-2000) terminals, Universal Mobile Telecommunication Service (UMTS) terminals, and so forth, can be used.

Figure 1:
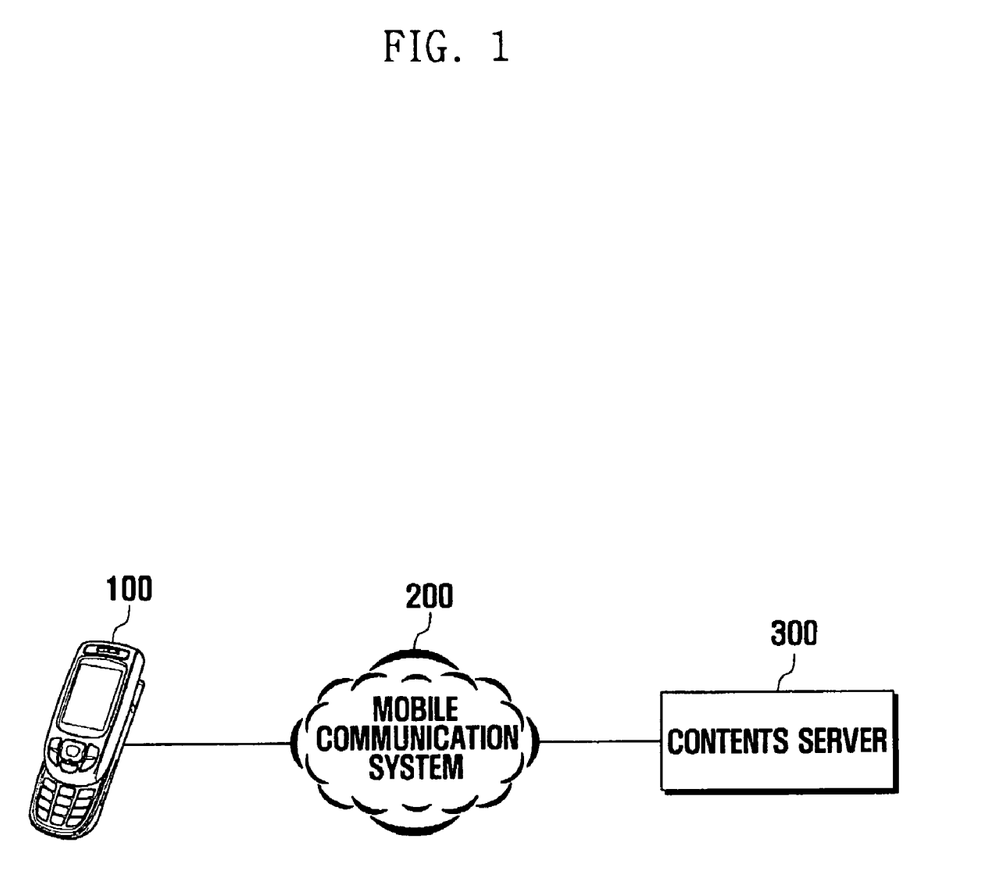
FIG. 1 is a schematic block diagram illustrating a multimedia service system to which exemplary embodiments of the present invention can be applied.
Figure 2:
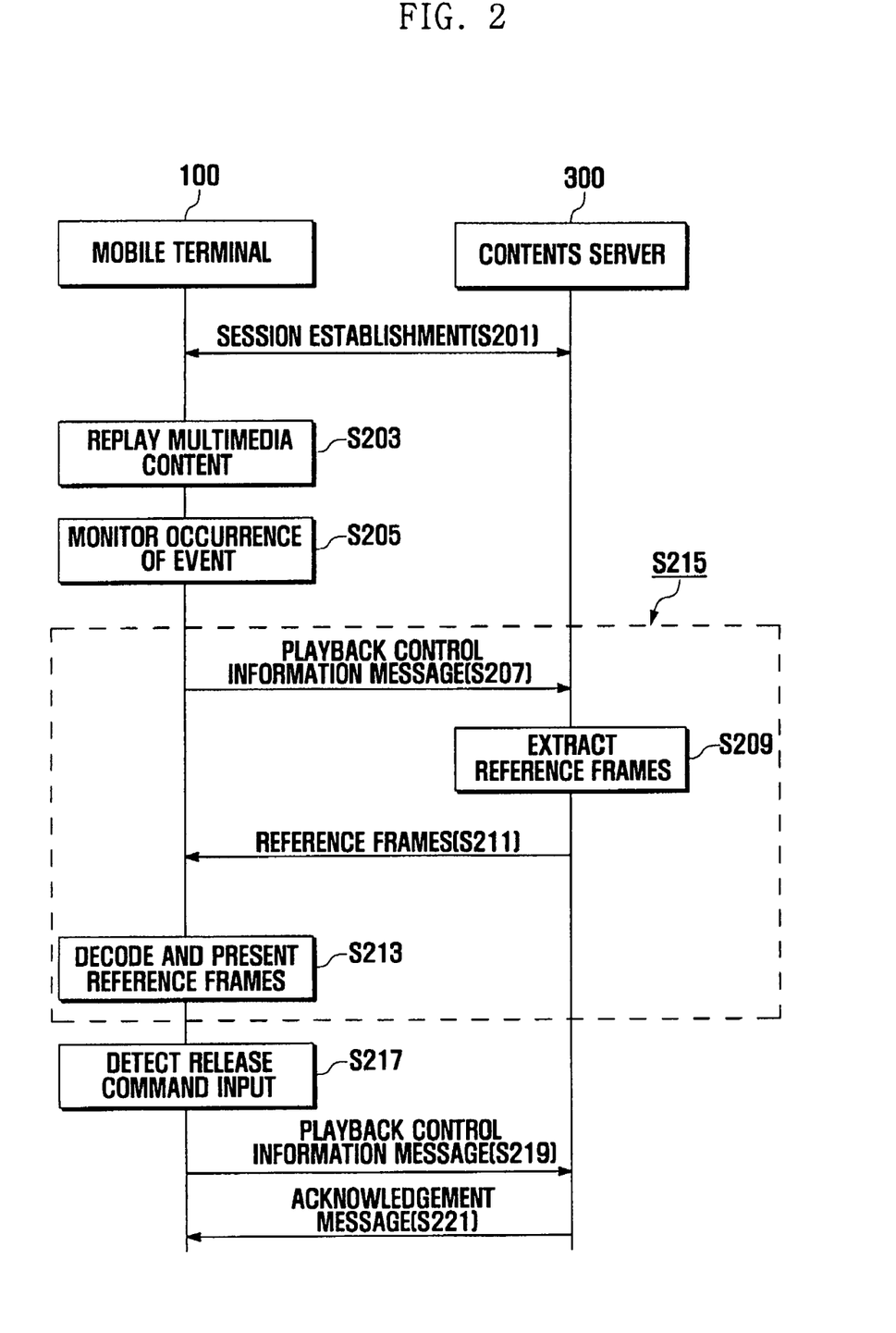
FIG. 2 is a message flow diagram illustrating a multimedia playback control method according to an exemplary embodiment of the present invention.

FIG. 1 is a schematic block diagram illustrating a multimedia service system to which embodiments of the present invention can be applied, and FIG. 2 is a message flow diagram illustrating a multimedia playback control method according to an exemplary embodiment of the present invention.

Referring to FIGS. 1 and 2, the multimedia service system comprises a mobile terminal 100 and a contents server 300 connected through a mobile communication system 200.

Various wireless data communication services as well as voice communication service, can be provided to the mobile terminal 100 by the mobile communication system 200.

The mobile terminal 100 accesses the contents server 300 through the mobile communication system 200 for downloading multimedia contents and replaying the downloaded multimedia contents in real time. That is, the mobile terminal 100 can perform downloaded service-based or stream service based-multimedia playbacks.

If a signal input for performing a fast forward or a rewind (FF/REW) operation is detected, the mobile terminal 100 transmits a playback control information message to the contents server 300 corresponding to the signal input, and displays video data of a reference frame received from the contents server in response to the playback control information message.

If the FF/REW command input is detected while replaying a contents file received in a downloaded service, the mobile terminal 100 checks a FF/REW speed from the command input. The mobile terminal 100 then extracts and displays reference frames in a predetermined interval corresponding to the FF/REW speed.

The mobile communication system 200 can comprise a base station (BS), a base station controller (BSC), a mobile switching center (MSC), a home location register (HLR), and a packet data serving node (PDSN).

The mobile communication system 200 is typically a wireless network provided for coupling the mobile terminal 100 to the contents server 300 (which can be located in the Internet (not shown)), such that the mobile communication network bridges a signal between the mobile terminal 100 and the contents server 300. The mobile communication system 200 also provides a communication channel between the mobile terminal 100 and the contents server 300 for supporting data exchange and streaming service.

The communication channel can be established with at least one of the following techniques, including Code Division Multiple Access (CDMA), Frequency Division Multiple Access (FDMA), Time Division Multiple Access (TDMA), Wideband CDMA (WCDMA), Portable Internet such as Wireless Broadband Internet (WiBro), Universal Mobile Telecommunication System (UMTS), and Orthogonal Frequency Division Multiple Access (OFDMA).

The contents server 300 collects and manages various multimedia contents and provides the multimedia contents to the mobile terminal 100 in a downloaded service or a stream service.

If multimedia content is requested for the stream service by the mobile terminal 100, the contents server 300 provides the requested content in a format appropriate for the stream service. The contents server 300 also receives the playback control information message from the mobile terminal 100 and transmits reference frames corresponding to the playback control information message.

A multimedia playback control method for a stream service according to an embodiment of the present invention will now be described in greater detail with reference to FIG. 2.

Referring to FIG. 2, when a session is established between the mobile terminal 100 and the contents server 300 through a negotiation at step (S201), the mobile terminal 100 can access the contents server 300 through the mobile communication system 200 and the contents server 300 can provide a multimedia contents list. If a content item is selected from the multimedia contents list and transmitted to the multimedia contents server 300, the stream service of the selected content item is initialized. The stream service can be implemented with various communication protocols such as a Real Time Transmission Protocol (RTP) and a Real Time Streaming Protocol (RTSP).

In an exemplary implementation, the session establishment is performed before the initialization of the stream service between the mobile terminal 100 and the contents server 300.

For example, if a stream service is requested by a user using a stream service application program, the mobile terminal 100 establishes a Transmission Control Protocol (TCP) session with the content server 300.

After the TCP session establishment, the mobile terminal 100 transmits a session information request message to the contents server 300. Upon receiving the session information request message, the contents server 300 prepares the stream service and transmits an acknowledgement message in response to the session information request message. The mobile terminal 100 can then obtain the information on the current session from the acknowledgement message.

Upon receiving the acknowledgement message, the mobile terminal 100 sets up a channel on the basis of the session information. In order to set up a channel, the mobile terminal 100 transmits a channel establishment request message to the contents server 300. Upon receiving the channel establishment request message, the contents server 300 sets up a channel and transmits an acknowledgement message in response to the channel establishment request message. Upon receiving the acknowledgement message, the mobile terminal 100 completes the setup of the channel with the contents server 300. After the establishment of the session, the mobile terminal 100 can download multimedia contents from the contents server 300 in a downloaded service or a stream service.

After the channel is established, the mobile terminal 100 buffers a multimedia content file and replays the multimedia content file by filling a buffer with data of the multimedia content file at step (S203). While playing back the multimedia content file, the mobile terminal monitors command inputs for the detection of the FF/REW command input.

If a multimedia playback request is input by a user, the mobile terminal 100 transmits a multimedia content file request message to the contents server 300. In response to the multimedia contents file request message, the contents server 300 starts transmission of the requested multimedia contents file to the mobile terminal 100. The mobile terminal receives the multimedia contents file and plays the multimedia contents file in cooperation with the buffer.

In this manner the user can listen to or watch a multimedia file through the mobile terminal 100.

Next, the mobile terminal 100 monitors command inputs for the detection of an occurrence of an event at step (S205). The event can be represented by pause, fast forward (FF), rewind (REW), stop, and record command inputs, but is not limited thereto. For example, in the case of downloaded service, a playback repeat command input can be an event. For illustration purposes, embodiments of the present invention are described below with reference to only the FF/REW command, but are not limited thereto.

If a FF/REW command is input, the mobile terminal 100 transmits a playback control information message corresponding to the FF/REW command at step (S207).

The playback control information message includes information on a message type (playback control request), Uniform Resource Locator, range and mode. The range indicator includes a winding speed for FF/REW (for example, Range: npt=xxx). The mode indicates that the playback control request is for FF (for example, mode:fast) or REW (for example, mode:rewind). Also, the range and mode information can be transmitted as corresponding information fields of the multimedia contents request message.

Specifically, if the FF/REW command is input, the portable terminal 100 extracts a winding speed from the FF/REW command and transmits, to the contents server 300, a playback control information message of which the range field is set to a value corresponding to the extracted winding speed.

The information fields of the playback control information message can be expressed as in the following examples:

Play rtsp://203.236.43.45:651/
00528_82776.skm RTSP/1.0
Range: npt=10.000000–
Mode: fast If a playback control information message is received, the contents server 300 extracts reference frames on the basis of the information of the playback control information message at step (S209).

At step (S209), the contents server 300 checks the range and mode fields of the playback control information message so as to obtain the winding speed and whether the playback control message is for FF or REW. After obtaining the winding speed and the command mode, the contents server 300 extracts reference frames corresponding to the winding speed.

The reference frames can include at least one of an Intra Pictures (I frames), Predicted pictures (P frames), and Bipredictive Pictures (B Frames). In the following description of an exemplary embodiment of the present invention for illustration purposes, I frames are utilized in consideration of picture quality and transmission rate. In this or other embodiments of the present invention however, any one or a combination of the I, P and B frames can be used as the reference frames.

Typically, video compression is performed with three major picture types: Intra frame (I frame), Previous or Predicted frame (P frame), and Bidirectional frame (B frame).

The I frame is a key frame coded without reference to any frame except itself, and has better quality and larger size than the P and B frames.

The P frame is coded with reference to other frames, i.e. to I frame such that prior decoding of some other frames is required. The image quality of P frame is worse than that of I frame, and the data amount of P frame is smaller than that of I frame.

The B frame is coded with reference to other frames but is never used as a reference for the prediction of other frames. The image quality of B frame is worse than that of P frame, and the data amount of B frame is smaller than that of P frame.

After extracting I frames, the contents server 300 transmits the extracted I frames to the mobile terminal 100 at step (S211). In order to transmit the I frames the contents server 300 can use the RTP.

Upon receiving the I frames, the mobile terminal 100 decodes the received I frames and displays the decoded frames through a display panel as still images at step (S213).

The steps (S207) to (S213), i.e. the procedure collectively referred to as (S215), can be repeated until a release command is input, for example, pressure on the FF or REW key is released. While the FF or REW command is continuously input, i.e. while the FF or REW key is pressed, the mobile terminal 100 continuously receives I frames from the contents server 300.

If a release command input is detected at step (S217) while receiving I frames from the contents server 300, the mobile terminal 100 generates a playback control information message corresponding to the release command and transmits the playback control information message to the contents server 300 at step (S219).

At steps (S217) and (S219), the mobile terminal 100 detects the FF/REW key release and transmits the playback control information message to the contents server 300 in response to the key release. The playback control information message includes the range and mode values set for indicating the key release.

Upon receiving the playback control information message from the mobile terminal 100, the contents server 300 transmits an acknowledgement message to the mobile terminal 100 in response to the playback control information message at step (S221).

At step (S221), the contents server 300 checks the range and mode fields of the playback control information message so as to recognize that the FF/REW key is released. If it is determined that the FF/REW key is released, the contents server 300 returns to a normal mode and obtains information on a normal playback speed from the range field. The contents server 300 then transmits the acknowledgement message 100 in response to the playback control information message. The contents server 300 also checks a playback position of the multimedia content corresponding to an instant at which the playback control information message was received and restarts transmission of the multimedia contents from that instant in time.

The mobile terminal 100 restarts playback of the multimedia content from a playback position corresponding to an instant when the FF/REW release command was input.

If the stream service of the multimedia content is terminated, the mobile terminal 100 ends the session by exchanging session termination-related messages with the contents server 300.

Figure 3:
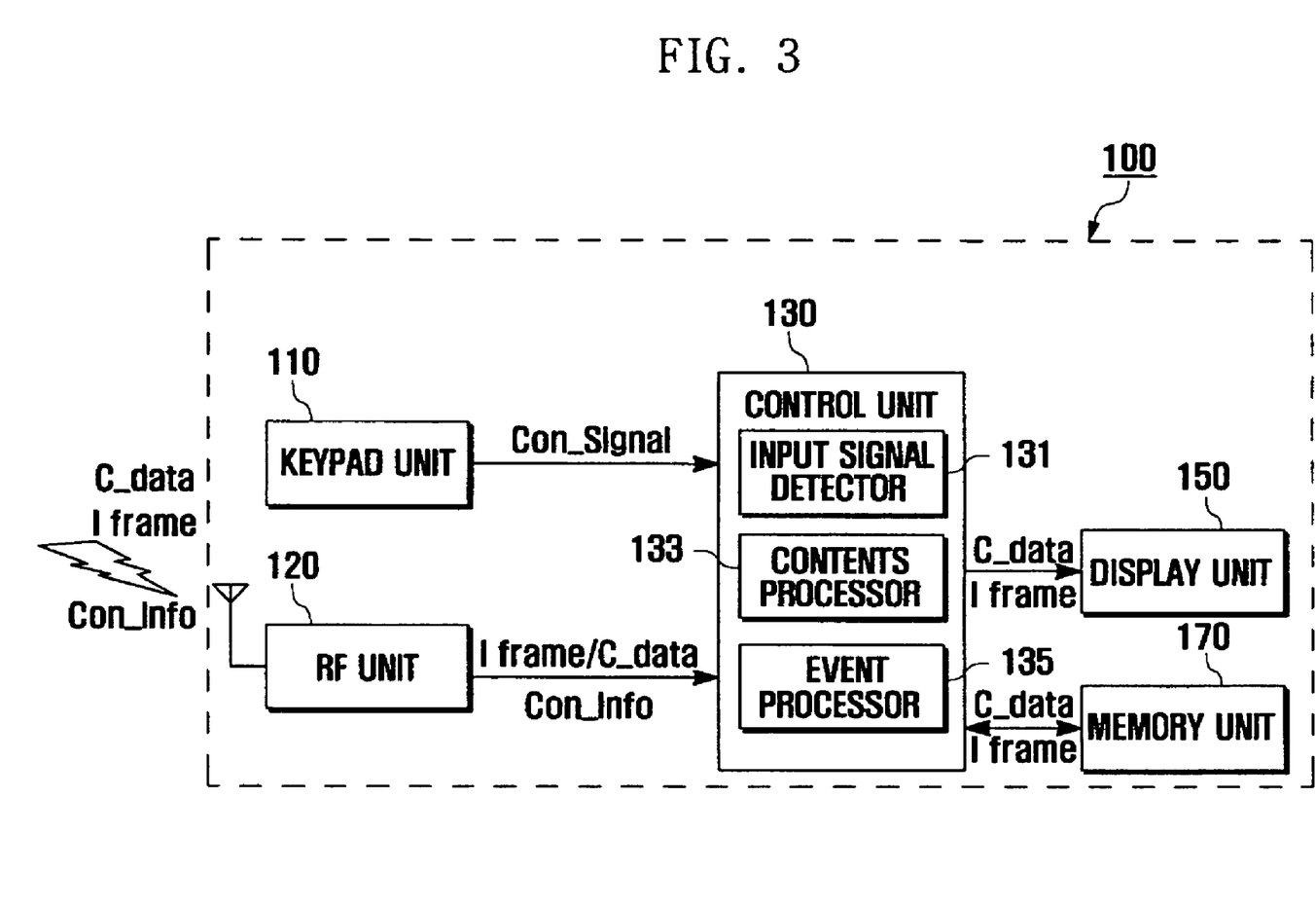
FIG. 3 is a block diagram illustrating a configuration of a mobile terminal of FIG. 1 according to an exemplary embodiment of the present invention.

FIG. 3 is a block diagram illustrating a configuration of the mobile terminal of FIG. 1 according to an exemplary embodiment of the present invention.

Referring to FIG. 3, the mobile terminal 100 comprises a keypad unit 110, a radio frequency (RF) unit 120, a control unit 130, a display unit 150, and a memory unit 170. The control unit 130 comprises an input signal detector 131, a contents processor 133, and an event processor 135.

The keypad unit 110 comprises a plurality of alphanumeric keys (not shown) for enabling a user to input alphanumeric characters and various function keys (not shown) for enabling the user to input commands for operating corresponding functions.

For example, the keypad unit 110 is implemented to input the control signals for controlling playback of multimedia contents in the exemplary embodiment shown. That is, the keypad unit 110 enables the user to input playback control commands such as a start command for starting playback of multimedia content, a pause command for temporarily halting the playback of the multimedia content, a stop command for stopping the playback of the multimedia content, a fast forward (FF) command for moving forward through the multimedia content at a speed faster than that of a normal playback flow, a rewind (REW) command for moving the playback position backward, and a record command for recording the currently replaying multimedia content. The control commands are then transferred to the control unit 130.

The RF unit 120 can comprise an RF transmitter for up-converting and amplifying the frequency of a transmitted signal and an RF receiver for low-noise amplifying a received signal and down-converting the frequency of the received signal. The RF transmitter and RF receiver are coupled to an antenna used for transmitting and receiving radio signals through an air channel.

The control unit 130 controls the signal exchanges between the units constituting the mobile terminal and can provide functions of a modem and a codec.

Specifically, the control unit 130 is implemented with the input signal detector 131, the contents processor 133, and the event processor 135 for controlling the playback of the multimedia contents The input signal detector 131 detects a control command (Con_Signal) input through the keypad unit 110. For example, the input signal detector 131 detects the playback control commands for controlling a playback of multimedia content, i.e. 'start', 'pause', 'stop', 'fast forward (FF)', 'rewind (REW)', and 'record' commands.

The contents processor 133 processes the playback of the multimedia content according to the playback control command (Con_Signal) detected by the input signal detector 131, executes an application program installed in the mobile terminal 100 according to the multimedia content playback signal, and replays the multimedia content in association with the application program. The contents processor 133 also performs the operations corresponding to the 'start', 'pause', 'stop', 'fast forward (FF)', 'rewind (REW)', and 'record' commands. The contents processor 133 still further performs playback of the multimedia content from a playback position corresponding to an instant when a key release signal is input.

The event processor 135 checks a service type for playback of multimedia content and performs an operation appropriate with the service type when the input signal detector detects an input of a playback control command while the contents processor 133 is playing the multimedia content.

In the case where the multimedia content is replaying in the stream service, the event processor 135 generates a playback control information message (Con_Info). In the case that the multimedia content is replaying in the downloaded service, the event processor 135 extracts predetermined frames from the currently replaying multimedia content.

The display unit 150 displays various menu screen images, user input data images, and various application data images. The display unit 150 displays the multimedia content provided by the downloaded service and stream service. The display unit 150 also displays still images extracted from the multimedia contents in accordance with the playback control command such as the fast forward (FF) command or the rewind (REW) command.

The display unit 150 can be implemented using a Liquid Crystal Display (LCD) and include a touchscreen function. When an LCD supporting the touchscreen function is implemented, the display unit 150 can also operate as an input means.

The memory unit 170 stores programs for controlling the general operation of the mobile terminal 100, application programs for operating the multimedia contents playback function, and downloaded multimedia content and user data. The memory unit 170 also buffers the data of the multimedia content downloaded in real time in the stream service. Accordingly, the memory unit 170 includes at least a buffer region.

The memory unit 170 comprises a program memory and a data memory. The program memory stores an operating system program for booting and controlling basic functions of the mobile terminal 100, various application programs for handling the multimedia contents playback function, camera functions, and image and motion picture playback functions of the mobile terminal 100.

The data memory temporarily stores data generated during the operations of the programs and a database for arranging the data in the form of a table. The data memory also stores multimedia content files transferred from an external memory and hard disk, and downloaded from a contents server 300 and a web server.

Figure 4:
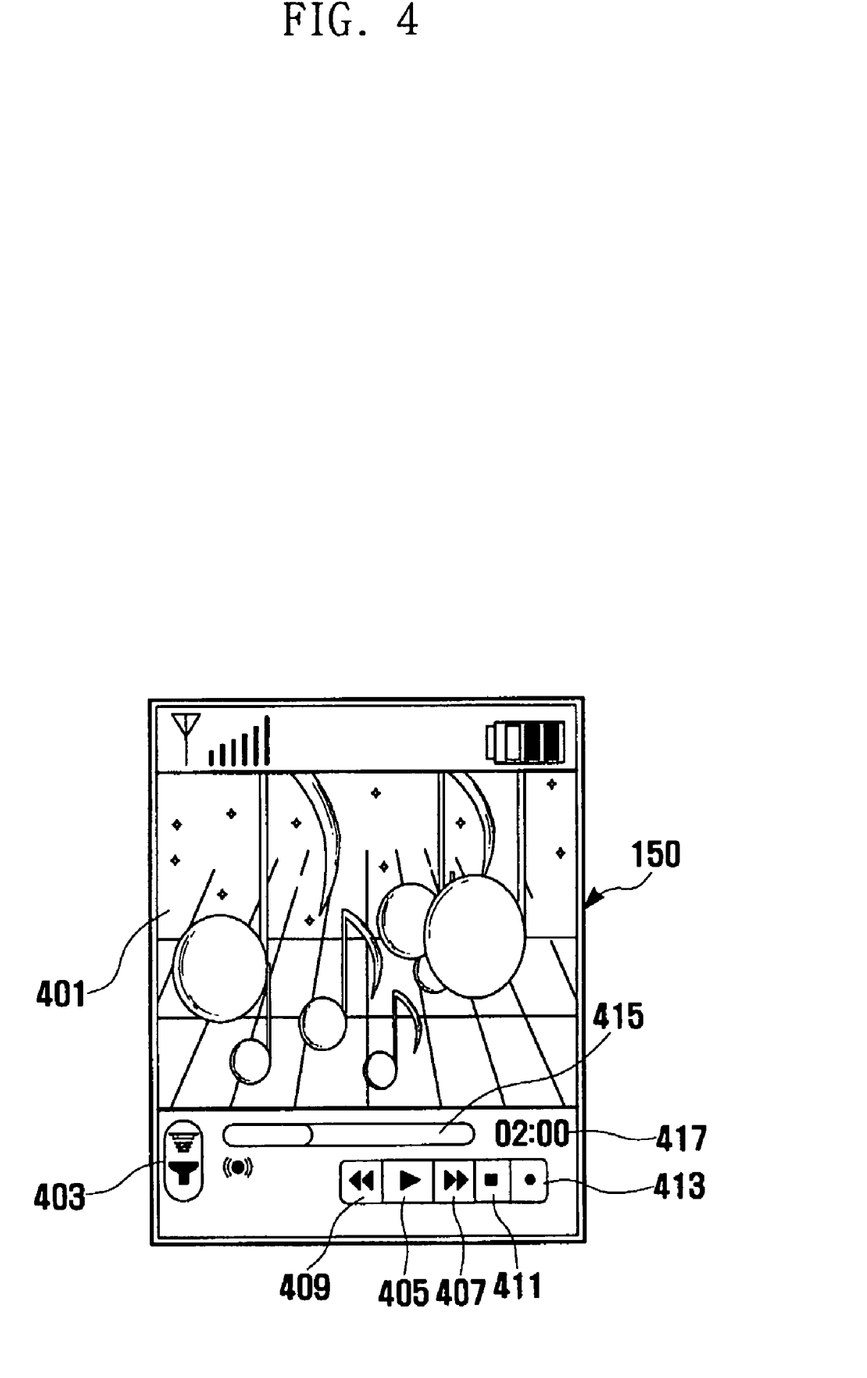
FIG. 4 is a view illustrating an example of a screen image of a display unit of FIG. 3 while replaying multimedia content according to an exemplary embodiment of the present invention.

FIG. 4 is a view illustrating an example of a screen image of a display unit of FIG. 3 while replaying a multimedia content according to an exemplary embodiment of the present invention.

Referring to FIG. 4, the mobile terminal 100 allows the user to check a playback status of the multimedia content through the display unit 150. The mobile terminal 100 executes a multimedia playback application 401 for replaying the multimedia content when a playback command input is detected.

In the case of the stream service-based playback command, the mobile terminal 100 displays the multimedia content being received from the contents server 300 on the display unit 150. In the case of downloaded service-based playback command, the mobile terminal 100 loads the multimedia content on the memory unit 170, and then displays the loaded multimedia content on the display unit 150.

The multimedia playback application 401 of the display unit 150 provides, for example, via a touchscreen, a volume control button 403, a play/pause button 405, a fast forward (FF) button 407, a rewind (REW) button 409, a stop button 411, a record button 413, a progress bar 415, and an elapsed time indicator 417.

While performing an FF or REW operation on multimedia content, the mobile terminal extracts predetermined frames from the multimedia content and displays the extracted frames corresponding to progress of the progress bar 415 and the elapsed time indicator 417.

In the case of the downloaded service-based playback, the mobile terminal extracts the reference frames and displays the extracted reference frames in a sequential order corresponding to the progress of the progress bar 415 and the elapsed time indicator 417 while the FF or REW command input is maintained. In the case of the stream service-based playback, the mobile terminal receives the reference frames from the contents server and displays the received reference frames in a sequential order corresponding to the progress of the progress bar 415 and the time indicator 417 while the FF or REW command input is maintained. In both cases, the mobile terminal changes the reference frames at every instant defined by the winding speed of FF or REW until the FF or REW command input is released.

In this manner, the user can quickly locate a playback position of the multimedia content.

Figure 5:
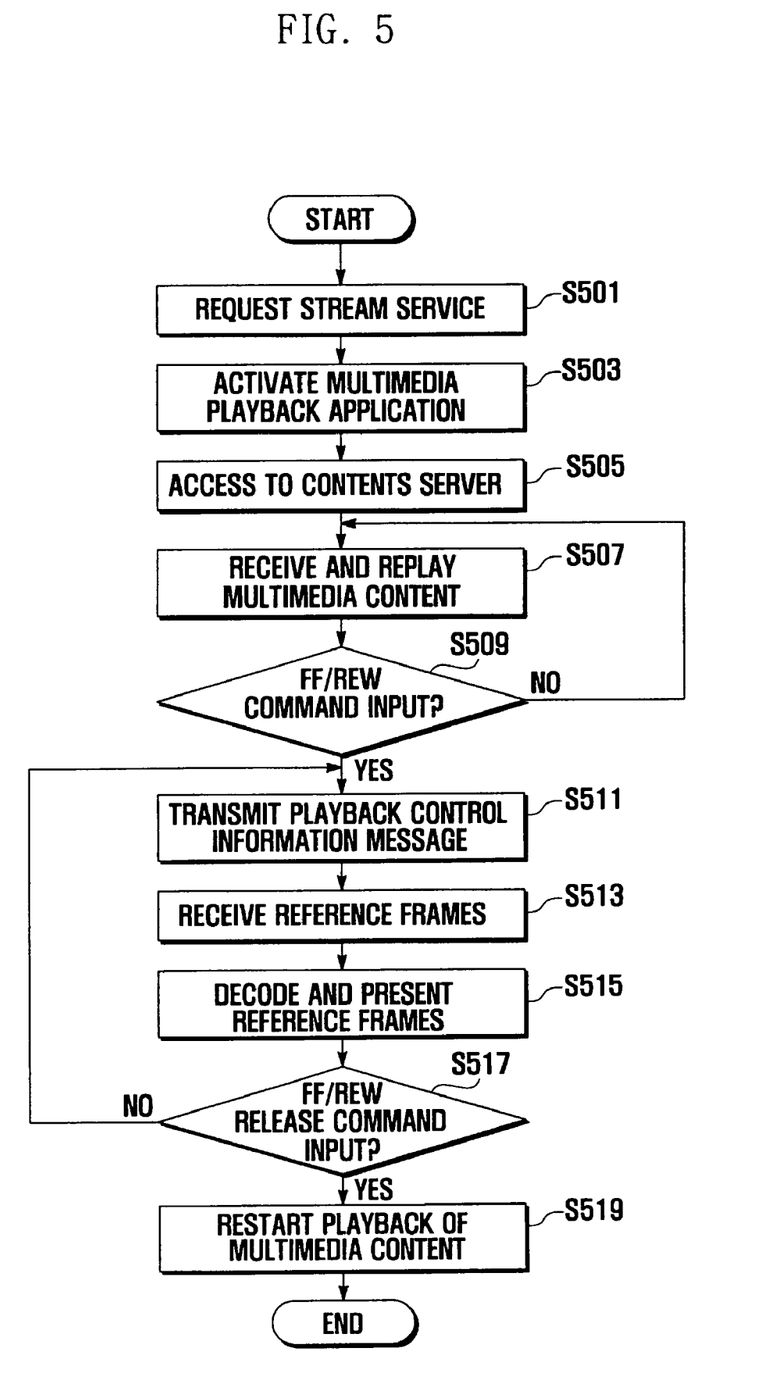
FIG. 5 is a flowchart illustrating a multimedia playback control method for a mobile terminal according to an exemplary embodiment of the present invention.

FIG. 5 is a flowchart illustrating a multimedia playback control method for a mobile terminal according to an exemplary embodiment of the present invention. In this embodiment the multimedia playback is performed on the basis of the stream service, but embodiments of the present invention are not limited thereto.

Referring to FIG. 5, a stream service request command is input to the mobile terminal at step (S501). The mobile terminal enables a user to input, for example by using a key manipulation, an execution command for activating a multimedia playback application for utilizing the stream service. When the stream service request command is input, the mobile terminal activates the multimedia playback application in response to the stream service request command at step (S503).

After the multimedia playback application is activated, the mobile terminal attempts to access a predetermined contents server providing the stream service in cooperation with the multimedia playback application at step (S505). The mobile terminal establishes a session with the contents server through a negotiation for the stream service.

If the session is established between the mobile terminal and the contents server, the mobile terminal receives multimedia content requested by the user from the contents server and replays the multimedia contents in real time at step (S507). At step (S507), the mobile terminal also buffers the data of the multimedia content received from the contents server for replaying the multimedia contents in real time.

While receiving and replaying the multimedia content, the mobile terminal determines whether an FF/REW command is input at step (S509). The mobile terminal monitors command inputs for the detection of an occurrence of an event while replaying the multimedia content and analyzes, if an event is detected, the event. The event can be the input of a control command, i.e. pause, FF, REW, stop, and record. In FIG. 5, the FF/REW command is shown as an example of the control command, but embodiments of the present invention are not limited thereto.

If an FF/REW command is input, the mobile terminal generates a playback control information message related to the FF/REW command and transmits the playback control information message to the contents server at step (S511). The playback control information message includes a URL field, a range field, a mode field, and so forth. The range field contains a value for a winding speed of the FF/REW command, and the mode field contains a value for indicating whether an FF or REW command is input.

In response to the playback control information message, the mobile terminal receives reference frames from the contents server at step (S513) and decodes the reference frames so as to display the reference frames on the display unit at step (S515). At step (S513), the reference frames are determined by the winding speed of the FF or REW. For example, the faster the winding speed, the greater the number of reference frames.

The steps (S511) to (S515) are repeated while the FF or REW command input continues. The reference frames are received from the contents server corresponding to the winding speed indicated by the range field of the playback control information message for the FF or REW command, such that the number of the frames extracted from the multimedia content changes according to the variation of the value of the range field. The reference frames are preferably extracted in a sequential order in time.

While replaying the received reference frames, the mobile terminal determines whether an FF/REW release command is input at step (S517). The FF/REW release command is generated when the pressure applied to the FF/REW key for inputting the FF/REW command is released. In yet other embodiments of the present invention, the FF/REW release command can be automatically generated when the FF/REW operation is completed, even though pressure may still be applied to the FF/REW key.

The mobile terminal repeats the steps (S511) to (S515) until the FF/REW release command is input. If an FF/REW release command is input, the mobile terminal restarts the playback of the multimedia content at step (S519).

At step (S519), the mobile terminal receives the data of multimedia content for normal playback from an instant when the FF/REW release command is input and replays the multimedia content in cooperation with the buffer in real time.

In this manner, the user can monitor a status of the progress of the FF or REW operation such that it is possible to quickly locate a playback position of the multimedia content.

Figure 6:
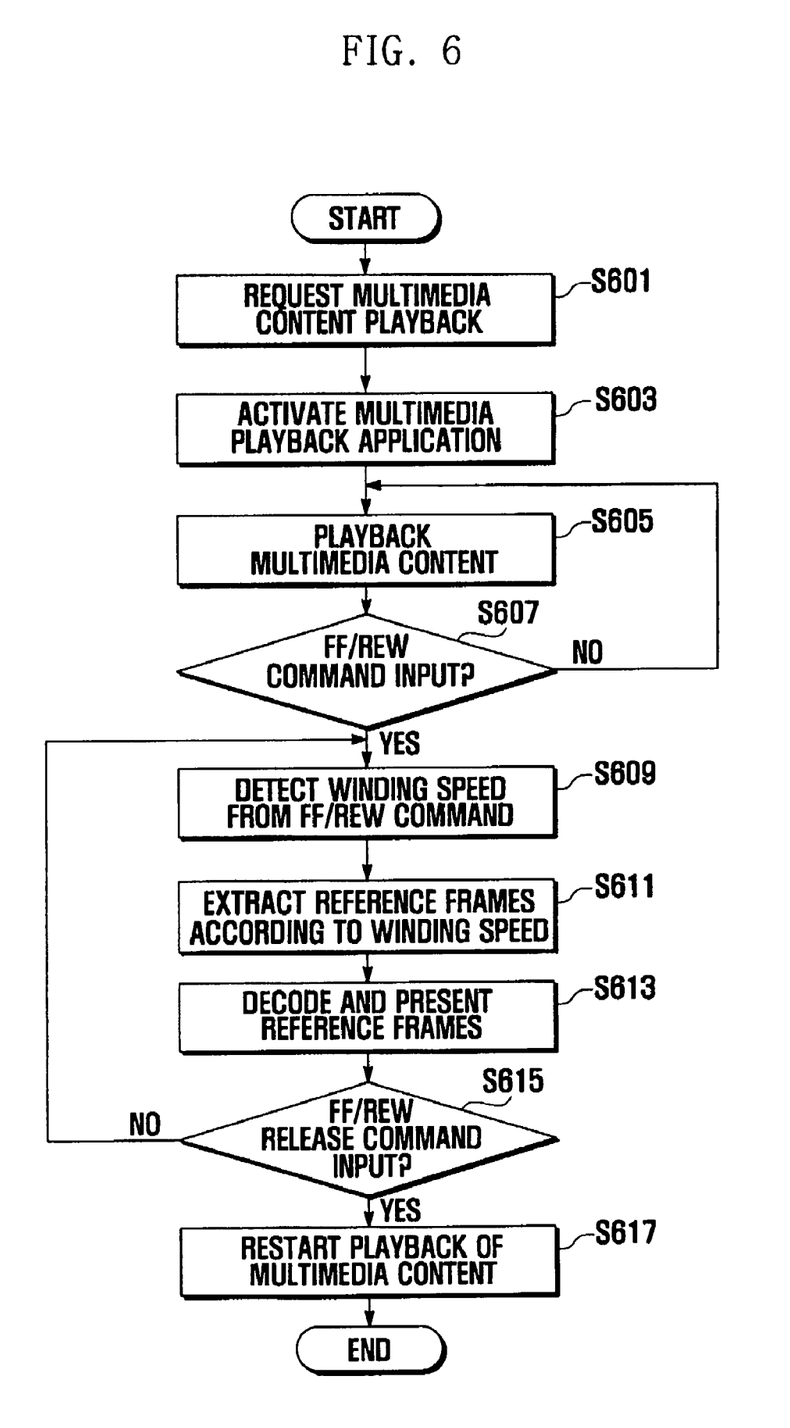
FIG. 6 is a flowchart illustrating a multimedia playback control method for a mobile terminal according to another exemplary embodiment of the present invention.

FIG. 6 is a flowchart illustrating a multimedia playback control method for a mobile terminal according to another exemplary embodiment of the present invention. In this embodiment the multimedia playback is performed on the basis of the downloaded service.

Referring to FIG. 6, a multimedia playback request command is input to the mobile terminal at step (S601). The mobile terminal enables a user to input, for example by using a key manipulation, an execution command for activating a multimedia playback application. When the multimedia playback request command is input, the mobile terminal activates the multimedia playback application in response to the multimedia playback request command at step (S603).

After the multimedia playback application is activated, the mobile terminal replays the multimedia content at step (S605). While replaying the multimedia content, the mobile terminal determines whether an FF/REW command is input at step (S607). At step (S607), the mobile terminal monitors command inputs for the detection of an occurrence of an event while replaying the multimedia content and analyzes, if an event is detected, the event. The event can be the input of a control command, i.e. pause, FF, REW, stop, record, and playback repeat. In FIG. 6, the FF/REW command is shown as an example of the control command, but embodiments of the present invention are not limited thereto.

If an FF/REW command is input, the mobile terminal analyzes a winding speed of the FF/REW command at step (S609) and then extracts reference frames from the multimedia content on the basis of the winding speed at step (S611). At step (S611), the reference frames include at least one of I, P, and B frames. The mobile terminal then displays the reference frames extracted from the multimedia content on the display unit at step (S613).

The steps (S609) to (S613) are repeated while the FF/REW command input continues. The reference frames are preferably extracted in a sequential order in time. Accordingly, the mobile terminal decodes the reference frames and displays the decoded reference frames on the display unit in a sequential order.

While replaying the extracted reference frames, the mobile terminal determines whether an FF/REW release command is input at step (S615). The FF/REW release command is generated when the pressure applied to the FF/REW key for inputting the FF/REW command is released. In yet other embodiments of the present invention, the FF/REW release command can be automatically generated when the FF/REW operation is completed, even though pressure may still be applied to the FF/REW key.

The mobile terminal repeats the steps (S609) to (S613) until the FF/REW release command is input. If an FF/REW release command is input, the mobile terminal restarts the playback of the multimedia content at step (S617).

At step (S617), the mobile terminal starts the playback of the multimedia content from an instant when the FF/REW release command is input.

In this manner, the user can monitor a status of the progress of the FF or REW operation such that it is possible to quickly locate a playback position of the multimedia content.

As described above, the multimedia playback control apparatus and method of certain exemplary embodiments of the present invention is advantageous in that a user can effectively locate a playback position since the mobile terminal displays reference frames even when winding a multimedia content forward or backward at high speed.

While the invention has been shown and described with reference to certain exemplary embodiments thereof, it will be understood by those skilled in the art that various changes in form and detail may be made therein without departing from the spirit and scope of the invention as defined by the appended claims and equivalents.

What is claimed is:

1. A multimedia playback control method for a mobile terminal, comprising:
   accessing a contents server providing a streaming service;
   receiving multimedia content from the contents server;
   replaying the multimedia content while receiving the multimedia content from the contents server;
   determining whether an event occurs while replaying the multimedia content;
   generating, if an event occurs, a playback control information message on the basis of the event;
   transmitting the playback control information message to the contents server;
   receiving reference frames of the multimedia content in response to the playback control information; and
   displaying the reference frames in a sequential order wherein the playback control information message includes a range value corresponding to a winding speed indicated by the event and a mode value indicating a type of the event, and the number of reference frames are selected based on the winding speed.

2. The multimedia playback control method of claim 1, wherein the event comprises one of a fast forward command input and a rewind command input.

3. The multimedia playback control method of claim 1, wherein the playback control information message comprises information on at least one of a command type, a Uniform Resource Locator (URL), a range, and a mode.

4. The multimedia playback control method of claim 1, wherein the reference frames comprise at least one of Intra frames, Predicted frames, and Bidirectional frames.

5. A streaming multimedia playback control method for a mobile terminal, comprising:
   determining whether a first event occurs during a playback of a streaming multimedia content;
   transmitting, if the first event occurs, a first playback control information message to a contents server;
   receiving reference frames from the contents server in response to the first playback control information message;
   displaying images corresponding to the reference frames in a sequential order;
   determining whether a second event occurs during the displaying of the images corresponding to the reference frames;
   transmitting, if the second event occurs, a second playback control information message to the contents server;
   receiving data of the multimedia content from the contents server in response to the second playback control information message; and
   displaying the data of the multimedia content, in real time, received from the contents server, wherein the playback control information message includes a range value corresponding to a winding speed indicated by the first event and a mode value indicating a type of the first event, and the number of reference frames are selected based on the winding speed.

6. The streaming multimedia playback control method of claim 5, wherein the first event comprises one of a fast forward command input or a rewind command input.

7. The streaming multimedia playback control method of claim 6, wherein the second playback control information message comprises information for releasing the fast forward command input or for releasing the rewind command input.

8. The streaming multimedia playback control method of claim 5, wherein the reference frames comprise at least one of intra frames, Predicted frames, and Bidirectional frames.

9. The streaming multimedia playback control method of claim 6, wherein the receiving of the reference frames comprises:
   extracting, at the contents server, a range value and a mode value from the first playback control information message;
   checking a type of the first event on the basis of the mode value;
   checking a winding speed indicated by the first event on the basis of the range value; and
   selecting the reference frames corresponding to the winding speed.

10. The streaming multimedia playback control method of claim 5, further comprising:
    obtaining still images by decoding the reference frames; and
    displaying the still images in a sequential order.

11. The streaming multimedia playback control method of claim 5, wherein the receiving of the data of the multimedia contents comprises:
    extracting, at the contents server, information on the second event from the second playback control information message;
    determining a playback position corresponding to when the second event occurs; and
    transmitting the data of the multimedia content from when the second event occurs.

12. A multimedia service system, comprising:
    a contents server for transmitting reference frames upon receiving a playback control information message while transmitting multimedia content; and
    at least one mobile terminal for generating a playback control information message if an event occurs while replaying the multimedia content received in real time from the contents server, transmitting the playback control information message to the contents server, receiving the reference frames in response to the playback control information message, and displaying the reference frames in a sequential order wherein the playback control information message includes a range value corresponding to a winding speed indicated by the event and a mode value indicating a type of the event, and the number of reference frames are selected based on the winding speed.

13. The multimedia service system of claim 12, wherein the reference frame comprises at least one of Intra frames, Predicted frames, and Bidirectional frames.

14. The multimedia service system of claim 12, wherein the mobile terminal comprises:
    a keypad unit for inputting playback control commands;
    a radio frequency unit for transmitting playback control information messages to a contents server and receiving multimedia contents from the contents server;
    a display unit for displaying multimedia contents and reference frames received in response to the playback control information message;
    a memory unit for storing the multimedia contents and buffering the data of the multimedia contents downloaded in real time in the stream service; and
    a control unit for controlling playback of the multimedia content and display of the reference frames of the multimedia content according to the playback control commands.

15. The multimedia service system of claim 14, wherein, the display unit comprises a touchscreen for inputting playback control commands.

* * * * *